Sept. 15, 1964 A. B. ACIEGO 3,148,455

MARKING DEVICE AND TAPE CASING HOLDER

Filed Jan. 30, 1961

INVENTOR.
ALFONSO B. ACIEGO

BY

Elliott & Pastoriza
ATTORNEYS

United States Patent Office 3,148,455
Patented Sept. 15, 1964

3,148,455

MARKING DEVICE AND TAPE CASING HOLDER

Alfonso B. Aciego, 15227 Freeman Ave., Lawndale, Calif.

Filed Jan. 30, 1961, Ser. No. 85,518
3 Claims. (Cl. 33—189)

This invention relates to holders and more particularly to a holding means for securing a tape casing and marking device in a given relationship with respect to each other whereby the taking of measurements and marking off of distances is greatly facilitated.

This invention relates to an improved structure over that set forth in my United States Patent No. 2,807,886, issued October 1, 1957, and entitled "Pencil and Tape Holder." As described in the foregoing patent, combined marking devices and tape measures are well known in the art. Many such prior art devices, for example, comprise a conventional tape casing housing a flexible tape adapted to be withdrawn or unrolled from a reel within the casing. A marking device in the form of a crayon or pencil is secured to the casing so that dimension lines may be drawn as the tape is simultaneously unreeled from the casing. Other devices simply provide a combination tape and pencil means for the convenience of the user in having each of the implements readily available.

In my above-mentioned patent, there is disclosed a holder for conveniently supporting a roller tape casing and pencil in a pre-determined relationship whereby marking off of definite distances is greatly facilitated. The holder itself is so constructed that a given conventional tape casing and pencil may be used without any modification of these separate implements. However, tape casings vary in size, dependent mostly upon the overall length of tape housed within the casing. As a consequence, a holder such as disclosed in my prior patent could only accommodate the one particular size of tape casing for which it was designed.

With the foregoing in mind, it is a primary object of the instant invention to provide an improved holder which will accommodate tape casings of different sizes to the end that an improved combined marking device and tape casing holder is provided having considerably greater versatility than prior art devices.

Another object is to provide a holder of the foregoing type which is extremely simple and economical to manufacture, and which may be easily attached to and carried by a person in a convenient position for immediate use.

Another important object is to provide a holder for securing a measuring tape and pencil in a given relationship such that measurements may be made and marked off by use of only one hand, whereby measuring operations are not only facilitated but accomplished in less time than has heretofore been required.

Another object is to provide a holding device having an improved marking support structure capable of accommodating different types of marking devices and holding the same in a given position even though various different ones of the marking devices vary widely in dimension.

Briefly, these and many other objects and advantages of this invention are attained by providing a holder formed from a single integral strip of resilient or spring-like material having a side wall portion including lower and upper portions bent into opposing relationship for engaging the bottom and top portions of a tape casing respectively. The side wall itself is preferably bowed with the concave side of the wall facing in the direction of the bent lower and upper edges so that the distance between the lower and upper edges may be varied by biasing the same apart to accommodate different sized tape casings. Because of the spring characteristic of the strip material itself, the tape casing is securely held in place.

As in the case of my prior holder, the side wall includes a forwardly extending portion folded back on itself to define a cylindrical portion for holding a marking device such as a pencil. Within this cylindrical portion there is provided a novel spring structure so that marking devices of different sizes may be securely held within the cylindrical portion. The folded back portion itself extends a sufficient distance to form in cooperation with the side wall a gripping means so that the holder may be clipped to a person's belt or pocket top for convenient carrying purposes.

A better understanding of the invention will be had by referring to one embodiment thereof as illustrated in the accompanying drawings, in which.

Figures 1, 2, 3:
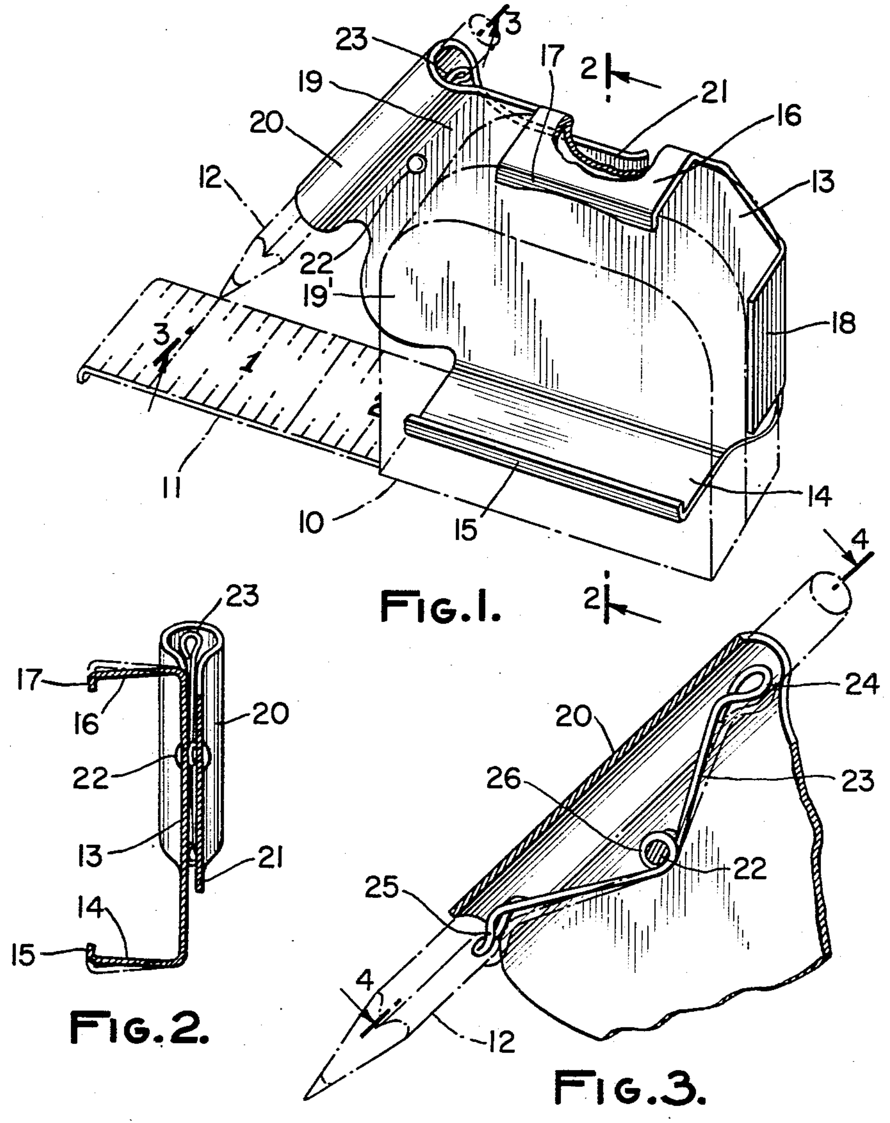
FIGURE 1 is a perspective view of the improved holder showing in dotted lines a typical tape casing and marking device.
FIGURE 2 is a cross section taken in the direction of the arrows 2—2 of FIGURE 1.
FIGURE 3 is a fragmentary cross section taken in the direction of the arrows 3—3 of FIGURE 1; and, FIGURE 4 is a fragmentary cross section taken in the direction of the arrows 4—4 of FIGURE 3.

Referring to FIGURE 1, the holding device is designed to support a tape casing indicated in dotted lines at 10 including a conventional flexible metal tape 11 shown partially extending therefrom, in cooperative relationship with a marking device in the form of a pencil 12. As shown, the holder itself comprises an integral strip of spring material having a side wall portion 13 including a lower edge bent through an angle of at least ninety degrees to define a base portion 14. The free end of the base portion 14 terminates in a generally upwardly extending flange 15. The dimensioning is such that the upwardly extending flange 15 will frictionally engage the bottom of the holder 10 at approximately its mid-line portion. The upper edge of the side wall 13 is also bent through an angle of at least ninety degrees or a right angle to define a top portion 16 terminating in a generally downwardly extending flange 17 arranged to frictionally engage the top portion of the casing 10.

In addition to the foregoing structure, the side wall also includes a rearwardly extending end bent about an axis generally at right angles to the lower and upper edges of the side wall 13 to define a rear tab 18 arranged to engage the rear side of the tape casing 10. The side wall 13 also includes a forwardly extending portion 19 folded back on itself to define a cylindrical portion 20 for holding the pencil 12. As shown in FIGURE 1, the folded back portion extends in a direction generally parallel to the side wall 13 as indicated at 21. This portion together with the side wall 13 defines a clip structure such that the holder may be arranged to grip a user's belt or top of his pocket for convenient carrying of the holder.

A single rivet 22 passes through the forwardly extending portion 19 and rearwardly extending folded back portion 21 immediately to the rear of the cylindrical portion 20. As will become clearer as the description proceeds, the rivet 22 serves not only to help maintain the cylindrical portion 20 in its initially formed configuration, but also serves to support a spring structure 23 within the cylindrical portion.

Referring now to FIGURE 2, it will be noted that the side wall 13 is preferably bowed with the lower and upper portions 14 and 16 extending from the concave side of the bow. With this bowed arrangement, the opposing base and top portions may be biased apart as indicated by the dotted lines so that tape holders of different dimensions may be readily accommodated there-between and frictionally secured in position. As the base and top portions 14 and 16 are biased apart towards their maximum amount, the action tends to flatten the side wall 13 as will also be clear from the dotted lines. The respective upwardly and downwardly extending flanges 15 and 17 engage the bottom and top portions of the tape casing so that large unit pressure is provided on the tape casing with attendant frictional gripping action.

Figure 4:
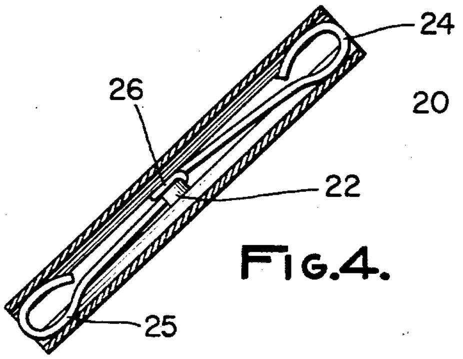

Referring now to FIGURE 3, the preferred form of construction for the spring 23 is shown. Essentially, the spring comprises a single spring wire having generally forwardly extending arms terminating in cradle like structures 24 and 25 for engaging the pencil 12. The mid-portion of the spring wire in turn is wound around the rivet 22 as indicated at 26. The foregoing structure is shown in top view in FIGURE 4 wherein it will be noted that the extreme ends of the single integral spring wire simply terminate after forming substantially closed cradling loops 24 and 25.

With the foregoing structure, it will be evident that a marking device of increased diameter could be inserted within the cylindrical portion and that the arms of the spring wire 23 may be biased generally rearwardly as indicated by the dotted lines so that under all conditions any one particular marking device will be securely held in position.

In operation, the holder may be handled with one hand, the conventional downwardly turned lip on the extreme end of the tape measure itself serving to hold the tape against one edge of the piece of work to be measured. With the end of the tape so secured, the tape is simply withdrawn from the casing 10 by pulling the holder away from the edge of the work. When the desired dimension is observed on the tape, the user may hold the tape with his thumb while resting the side of his thumb against a lower outwardly curved portion 19' on the forwardly extending portion 19. A simple manual rocking movement of the holder will then cause the tip of the pencil 12 to mark the work adjacent the proper index point on the tape. The curved portion 19' will facilitate rocking movement of the holder. Alternatively, the upper end of the pencil 12 may simply be moved to mark a point adjacent the tape. This latter operation is facilitated by the single spring structure within the cylindrical portion 20 which will permit resilient movement of the pencil 12 without any rocking movement of the holder. By inclining the axis of the cylindrical portion as shown, the tip of the pencil or other marking device is oriented in the normal position for effecting a desired marking.

From the foregoing, it will be readily apparent that the present invention has provided an extremely simple holder whereby a conventional tape casing of any one of several different sizes, as well as a suitable marking device or pencil of any one of several different sizes, may be secured in a given relationship with respect to each other so that the measuring and marking of dimensions is greatly facilitated. By forming the holding device from a single integral strip, its manufacture may be performed in an extremely economical manner.

The feature of the folded back portion 21 cooperating with the side wall portion 13 to provide a relatively large area clip enables the holder to be retained by a person in a convenient position for ready use.

Minor modifications falling within the scope and spirit of the instant invention will occur to those skilled in the art. The improved holder is therefore not to be thought of as limited to the exact embodiment set forth merely for illustrative purposes.

What is claimed is:

1. An improved holder for holding a tape casing and marking device in a given relationship with respect to each other, comprising: an integral strip of spring like material having a bowed side wall including a lower edge portion bent through at least a right angle in a direction outwardly from the concave side of said wall and terminating in a generally straight upwardly extending flange terminating in an upper edge for frictionally engaging in substantially a line contact the bottom of said tape casing to prevent sliding movement of the bottom of said tape casing relative to said upper edge, said sidewall including an upper edge portion bent through at least a right angle in a direction outwardly from the concave side of said wall and terminating in a generally straight downwardly extending flange terminating in a lower edge for frictionally engaging in substantially a line contact the top of said tape casing to prevent sliding movement of the top of said tape casing relative to said lower edge, said sidewall also including a rear portion bent about an axis generally at right angles to said lower edge and upper edge to define a rear tab for engaging the rear portion of said tape casing, said side wall having a forwardly extending portion folded back on itself to define a cylindrical portion for securing said marking device, the folded back portion extending rearwardly in spaced relationship to said side wall to define therewith a gripping means.

2. An improved holder according to claim 1, including a single rivet passing through said forwardly extending portion and folded back portion immediately to the rear of said cylindrical portion; and a single spring wire having its mid-portion wound about said rivet between said forwardly extending portion and said folded back portion, said wire having arms biased forwardly into said cylindrical portion to frictionally engage and hold any one marking device inserted therewithin.

3. An improved holder according to claim 2, in which said forwardly extending portion includes a lower outwardly curved portion adjacent to the edge of said tape providing a rest for the user's thumb when manipulating the holder.

References Cited in the file of this patent

UNITED STATES PATENTS

| | | |
|---|---|---|
| 429,087 | Dickins | May 27, 1890 |
| 610,286 | Seat | Sept. 6, 1898 |
| 1,110,968 | Southard | Sept. 15, 1914 |
| 2,070,255 | Carlson | Feb. 9, 1937 |
| 2,807,886 | Aciego | Oct. 1, 1957 |

FOREIGN PATENTS

| | | |
|---|---|---|
| 1,051,580 | France | Sept. 16, 1953 |